Aug. 9, 1966 G. W. ELLIS 3,265,811

TWO CHANNEL SIMULTANEOUS COLOR PROJECTION SYSTEMS

Filed April 30, 1963 2 Sheets-Sheet 1

INVENTOR:
GEORGE W. ELLIS,

BY Marvin C. Goldenberg
HIS ATTORNEY.

TWO CHANNEL SIMULTANEOUS COLOR PROJECTION SYSTEMS

Filed April 30, 1963

INVENTOR:
GEORGE W. ELLIS,

BY Marvin L. Goldenberg

HIS ATTORNEY.

United States Patent Office 3,265,81

Patented August 9, 196

3,265,811

TWO CHANNEL SIMULTANEOUS COLOR PROJECTION SYSTEMS

George W. Ellis, Liverpool, N.Y., assignor to General Electric Company, a corporation of New York Filed Apr. 30, 1963, Ser. No. 276,856
13 Claims. (Cl. 178—5.4)

Figure 1:
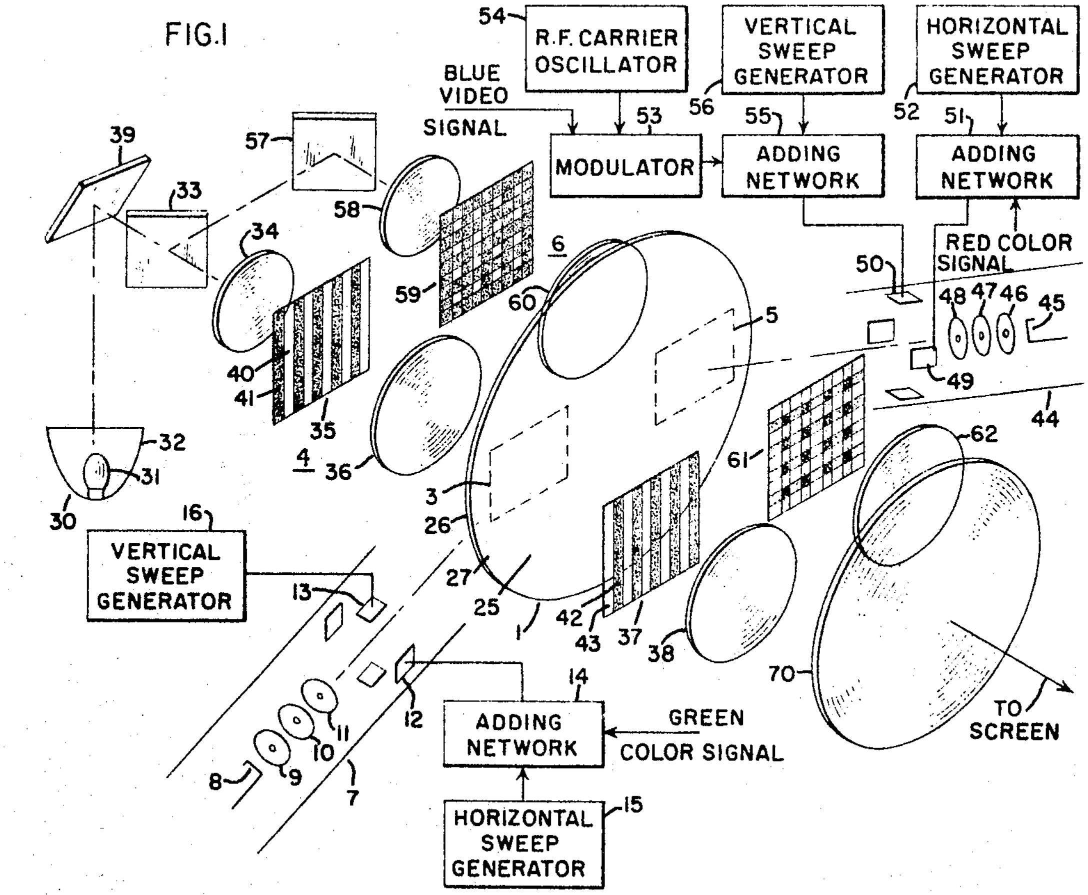

The present invention relates to color projection systems and more particularly to color projection systems of the type employing a deformable light modulating medium such as an oil film.

In general, light projection systems of the type to which this invention relates are employed for displaying information introduced in the form of electrical signals. Typically, a modulated electrical charge which conveys the information is deposited as a raster upon the surface of a deformable medium. This may be readily accomplished by means of a scanned electron beam. The surface charge acts to differentially deform the medium in accordance with the charge intensity. The medium is employed to modulate a source of light directed thereon for providing enlarged projected displays. These systems have application for projecting live and recorded dynamic information, such as may be transmitted in the form of television signals.

When projecting color information, the composite color image is transformed into three component images in a conventional manner, each conveying the color information of a single primary color. For example, the composite color image is normally divided into its red, blue and green component images. In one system of the prior art, the information is written and projected in a field sequential manner. Thus, the three primary colors of a composite color image are successively writen and projected in rapid sequence. For such field sequential system, a single electron beam may be employed and a single light channel is used in the optical system. Since information must be transmitted sequentially, the systems have a bandwidth limitation. As a result, the information content or resolution of the projected image is limited and the resulting picture quality is not entirely satisfactory.

Another system for projecting colored light information is of the three channel simultaneous type wherein the three primary colors of a composite color image are transmitted simultaneously for simultaneous projection. In systems of this type, a separate electron gun is required for writing the information of each primary color, and separate light channels must be used for each color. Although picture quality is normally superior to the field sequential system because of a greater effective bandwidth characteristic, the three channel simultaneous systems have the obvious disadvantage of requiring multiple electronic and optical equipment. In addition, it is necessary to accurately register three separate optical images to form the composite color image.

There also exists a single channel simultaneous system in which the information of each primary color component is written on the light modulating medium in the form of light diffraction gratings that have dimensions corresponding to the wavelength of the associated primary color components and wherein diffraction phenomena are relied upon for providing separation of the color components. The method of writing the color information in this system places rigorous constraints on the design of the optical components and provides a limitation in brightness of the projected image. It also requires for a given resolution of the projected image, a more highly focused or smaller spot size beam, so that everything else being equal, the resolution of the single channel simultaneous system is not as good as in the above-described systems.

Accordingly, it is an object of the present invention provide an improved color projection system of the ty employing a deformable light modulating medium whi has the advantages of a three channel simultaneous syste i.e., for a given bandwidth projecting an image having picture quality and resolution commensurate with that a three channel simultaneous system, but which emplo a substantially reduced number of electronic and optic components.

It is a further object of the present invention to provi an improved simultaneous color projection system emplo ing a deformable light modulating medium which obtai an image resolution comparable to that of a three chanr simultaneous system, but which does not require separa writing and readout means for each primary color of composite color image.

It is also an object of the present invention to provi an improved simultaneous color projection system e ploying a deformable light modulating medium which o tains an image resolution comparable to that of a thr channel simultaneous system, wherein the requiremer for registration of the plural color component images a reduced.

It is another object of the present invention to provi an improved simultaneous color projection system e ploying a deformable light modulating medium whi obtains an image resolution comparable to that of three channel simultaneous system, wherein more than single primary color component of a composite color i age is written on a single modulating medium.

It is a further object of the invention to provide an i proved method of and means for impressing informati onto a deformable light modulating medium.

Briefly, these and other objects of the invention a accomplished in a color projection system by writing t information of one primary color component of a co posite color image on a first single raster area of a d formable light modulating medium such as an oil fil and writing the information contained in the remainir two primary color components on a second single rast area of the deformable medium. The color informatio introduced in the form of electrical signals, is written b a first scanned electron beam to form a light deviatir line pattern or grating on the first raster area and by second electron beam to form a pair of orthogonally a ranged light deviating gratings on said second raster are The gratings, each containing the information of esse tially a single color component, are composed of a seri of adjacent ripples of variable incremental depth on t surface of the oil which phase modulate a source projected light in accordance with the impressed inform tion. Two separate optical channels, one for each rast and each including input and output aperture masks f converting the phase modulated light to amplitude mod lated light are employed for displaying the information in pressed on the raster areas. In the first channel, light said one primary color component is directed through th first raster and projected onto a screen as a first primar color image. Simultaneously, in the second channel lig of the two remaining primary color components is d rected through the second raster, these light componen being separately modulated thereby and projected ont the screen as the second and third primary color imag in registration with the first primary color image to for the composite color image.

Figures 2A, 2B, 4, 5:
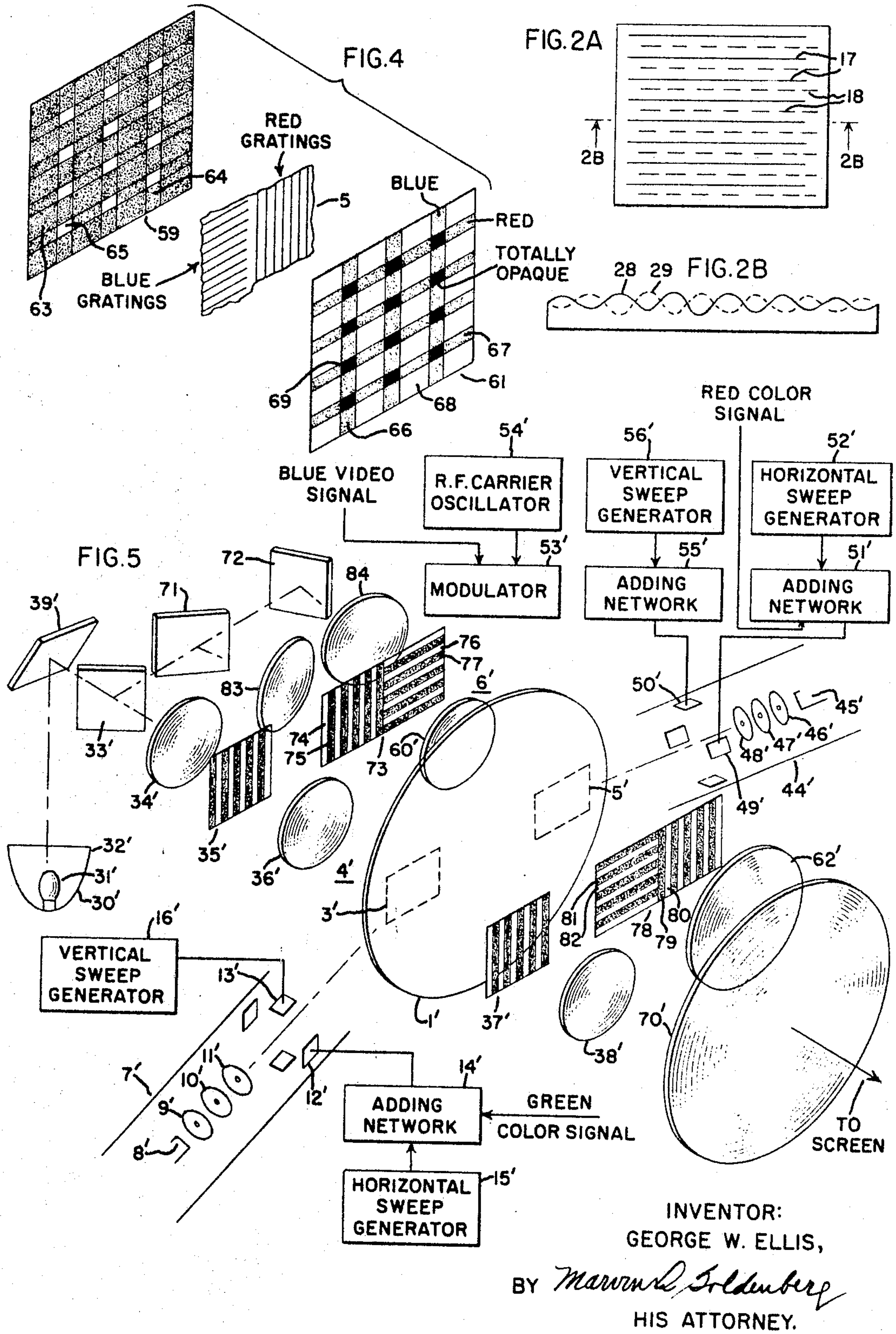

In one particular embodiment of the invention the inp and output aperture masks of the first optical channel a each composed of a series of transparent and opaque po tions, light of said one color component being transmitte through the transparent portions of the input mask an differentially transmitted through transparent portions the output mask in accordance with the modulations o rst raster. The input aperture mask of the second .l channel is composed of a first series of spaced ie portions and a second series of spaced opaque ns, said first and second series being orthogonally ged and superimposed. Projected light of the second iird color components is transmitted through trans- t apertures provided by the intersecting opaque por- The two primary color components of the light :ted in the second channel upon being modulated : second raster are separated at the output aperture which is composed of a first and second series of gonally arranged, superimposed, spaced filter strips orrespond to the transparent and opaque portions of iput mask. Light differentially transmitted through st and second series filter strips in accordance with iodulations on the second raster is projected as the d and third primary color images, respectively.

another particular embodiment of the invention, the rimary color components projected in the second iel are separated by a pair of dichroic reflectors input to the channel. The input and output aper- nasks each include a first and second series of trans- t and opaque portions, said first and second series be- thogonally arranged and adjacently disposed. Light : second primary color component, reflected by one : dichroic reflectors is directed through the first series arent portions of the input mask and differentially nitted through the first series transparent portions : output mask in accordance with the modulation in- ition of the second primary color component on the d raster. Light of the third primary color com- it, reflected by the other dichroic reflector is directed gh the second series transparent portions of the input and differentially transmitted through the second se- ansparent portions of the output mask in accordance the modulation information of the third primary component on the second raster.

accordance with a further aspect of the invention, s are provided for horizontally interlacing the ver- ight deviating gratings on the raster areas during the ig of successive fields. Horizontal interlacing en- :s control of the modulating medium and also izes the persistence of the orthogonally impressed igs of the second optical channel.

iile the specification concludes with claims particu- pointing out and distinctly claiming the subject matter i is regarded as the invention, it is believed that the tion will be better understood from the following iption taken in connection with the accompanying ngs in which:

3URE 1 is a schematic perspective illustration of a :hannel simultaneous color projection system in ac- nce with one embodiment of the present invention;

3URE 2A is a schematic diagram showing a plan of the type of raster formed on the light modulating ım;

3URE 2B is a schematic diagram of a cross sectional of the raster illustrated in FIGURE 2A taken along ne B—B;

3URE 3 is a block diagram of a portion of the elec- circuitry that may be employed in the various em- nents of the present invention for providing an im- :ment in the process of impressing information on the mable light modulation medium;

GURE 4 is a schematic diagram of the input and out- perture masks employed in the two color channel : system of FIGURE 1; and 3URE 5 is a schematic perspective illustration of a :hannel simultaneous color projection system in ac- nce with a second embodiment of the present inventh reference to FIGURE 1 there is illustrated, in ac- nce with the invention, one embodiment of a two iel simultaneous color projection system wherein ed light information in the form of electrical signals is applied to a deformable light modulating medium 1 for displaying said information as a complete color image on an enlarged display member or screen, not shown. More specifically, the colored light information is in the form of three color signals, such as television signals, each signal conveying the information of a single primary color component of the composite color image to be displayed. In the example under consideration, green, blue and red color signals are employed. The green color information is written as a light deviating line pattern or grating on a first raster area 3 of said light modulating medium 1 and is projected by means of a first optical channel 4 onto the screen. The blue and red color information is written as a pair of orthogonally arranged light deviating line patterns or gratings on a second raster area 5 of said modulating medium 1 and is projected onto the screen by means of a second optical channel 6.

A first electron beam device 7, shown in a simplified form for ease of illustration to include a cathode 8, grid 9, anode 10, focusing electrode 11, horizontal deflection electrodes 12 and vertical deflection electrodes 13, is employed for writing the green information. The green color signal provides a velocity modulation of a constant current beam as it is scanned across the raster 3 in what may be considered to be the horizontal direction. The green color signal, which is essentially an R-F carrier amplitude modulated in accordance with the green video signal, is applied as a first input to an adding network 14 and the horizontal sweep voltage generated by an oscillator 15 is applied as a second input to network 14. The output of network 14 is applied to the horizontal deflection electrodes 12 for providing in a known manner a horizontal sweep of the beam, velocity modulated in accordance with the green color signal. The horizontal sweep frequency is conventionally 15,750 cycles per second. The green color signal R-F carrier is maintained in synchronism with the horizontal sweep voltage, the R-F carrier frequency being higher than the highest video frequency but not so high as to prevent the impressing of resolvable grating lines on the light modulating medium. This frequency was about 8 mc. per second in one operating embodiment. Oscillator 16 applies a relatively low frequency vertical sweep voltage to vertical deflection electrodes 13 in a conventional fashion. The frequency of the vertical sweep is typically 60 cycles per second.

Accordingly, the electron beam is scanned horizontally at a velocity that is modulated in accordance with the intensity of the green color component and vertically at a constant velocity so that during every $1/60$ of a second there is described on the raster 3 a field of essentially horizontal lines of electrical charge. A line interlaced scanning pattern in the vertical direction of two fields per frame is normally employed, in common with television practice, so that alternate lines of a complete frame are written during the formation of each field. The line charge pattern is shown in FIGURE 2A, the solid lines 17 being drawn for one field and broken lines 18 for the second field.

Figure 3:
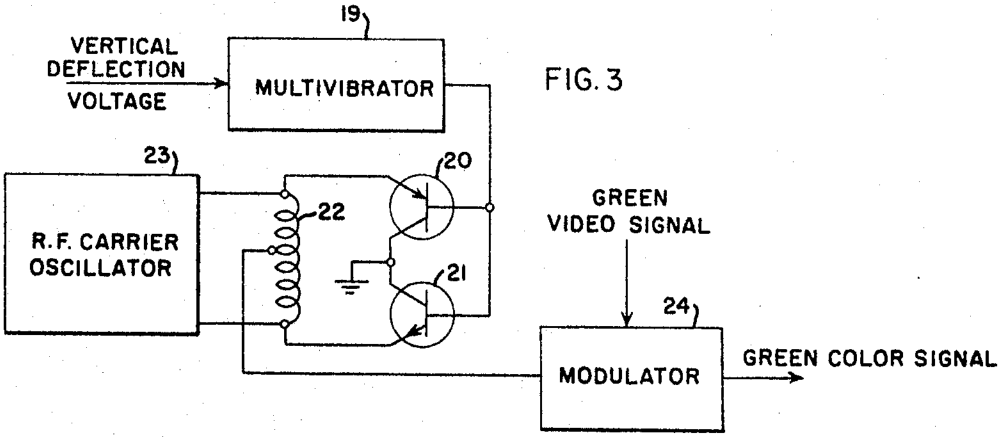

In addition, it may be seen from FIGURE 2A that a line interlaced pattern in the horizontal direction is provided, the line charges of alternate fields being horizontally displaced by a distance approximately equal to the horizontal travel of the beam during one half cycle of the green signal. Horizontal interlacing is accomplished by inserting a one half cycle phase shift in the carrier of the green color signal circuit during alternate fields. Appropriate circuitry for performing this function is shown in FIGURE 3. The advantages of this mode of writing will be discussed presently.

As illustrated in FIGURE 3, the vertical deflection voltage is coupled to a frequency divider circuit, typically a triggered bistable multivibrator 19, for providing a square wave output voltage whose frequency is one half the vertical deflection voltage frequency. The output of multivibrator 19 is coupled to the base electrodes of switching transistors 20 and 21 to cause alternate saturated conduction and nonconduction of the transistors, thereby alternately grounding opposite end terminals of the output winding 22 of the R-F carrier oscillator 23. The center tap of winding 22 is connected to a modulator 24 and provides coupling of the R-F voltage from oscillator 23 periodically phase shifted by 180° as a function of the vertical deflection voltage. The green video signal, normally supplied from a demodulator, not shown, is coupled as a second input to modulator 24, the output thereof being the green color signal that is applied to the adding network 14 of FIGURE 1.

The modulating medium 1 upon which the line charges of the rasters 3 and 5 are impressed includes a thin layer of deformable material such as a moderately viscous fluid or plastic substance deformable in response to the deposition of electrical charge. In the present exemplary embodiment there is employed on oil film 25, such as a silicone oil. The oil is deposited onto a transparent substrate 26, typically glass, which is overlaid by a thin coating of a transparent conductive material 27, for example, a coating of gold and indium or cuprous iodide. By means of the velocity modulated beam, the line charges are impressed with a varying incremental charge density in the direction of the lines, the charge density being a function of the velocity modulation of scan. Electrostatic forces exerted between the electrical charge on the surface of the oil 25 and induced charges at the conducting layer 27 deform the surface in undulating fashion along the lines of charge, the undulations having an incremental depth proportional to the charge density. The deformations of adjacent line charge of successive fields are illustrated in FIGURE 2B, the solid line 28 corresponding to a first field and the broken line 29 to the second field.

The undulations align in the vertical direction to form the grating lines upon the raster 3 orthogonal to the lines of charge. The sloped areas of the grating lines refract and diffract in the direction of the lines of charge a substantial portion of the light projected through the deformed surface. This deviated light is utilized to project the green color information onto the screen, as will be described subsequently. By interlacing in the horizontal direction electrical charge of successive fields is deposited on the ridge portions of the previously impressed grating. Accordingly, a pumping action of the oil surface is effected, providing an improved control and faster response of the deformations. It may be pointed out that the surface charge deposited on each line of charge will be discharged through the surface of the oil during the period of a single field. In addition, the time constant of restoration of the oil medium must be fast enough to allow the deformed surface to return to its original levels during this period. This constraint is abetted by writing in a horizontally interlaced pattern. Because vertical interlacing is normally employed for compatibility with received television signals, a further advantage of horizontal interlacing accrues in that the time constant of restoration of the oil in the horizontal direction is made comparable to the time constant of restoration in the vertical direction. This is of importance when superimposing information onto orthogonally arranged gratings, as it will be seen is done on the raster 5 of the second optical channel 6, for providing a uniform projection of the orthogonally written information.

The information contained on the raster 3 is read out by means of a source of white light 30, shown in an exemplary form as including a Xenon arc lamp 31 and a parabolic reflector 32, in combination with the light channel 4. Light channel 4 includes in the order recited a dichroic mirror 33, lenticular lens 34, input aperture mask 35, lens 36, commonly termed a Schlieren lens, output aperture mask 37 and objective lens 38. Raster 3 is disposed between the Schlieren lens 36 and the output aperture mask 37. The white light from source 30 is reflected by mirror 39 which transmits the nonvisible, heat producing energy, the reflected white light being made incident on the dichroic mirror 33. Mirror 33 transmits light of green wavelength and reflects light of magenta wavelength. The input aperture mask 35 has a series of adjacent transparent and opaque portions 40 and 41, respectively aligned in the direction of the line gratings of the raster 3. The output aperture mask 37 has corresponding opaque and transparent portions 42 and 43, respectively. The lenticular lens 34 functions to focus the green wavelength light through the transparent apertures 40 with the light transmitted by each aperture illuminating the entire raster area 3. Accordingly, an efficient and uniform illumination of the raster area 3 is provided. The transparent portions 40 of input mask 35 are imaged onto the opaque portions 42 of output mask 37 for an undeformed condition of the oil. Thus, elemental areas of raster 3 which are undeformed provide no light on the screen 2. For deformed surface areas of the raster 3, light is deviated by means of refraction and diffraction phenomena so as to be transmitted through the transparent portions 43 of the output mask with an intensity that is a function of the deformations and, therefore, the green color information. The transverse dimensions of the transparent portions of the output mask are sufficiently large so as to pass on the order of several orders of the transmitted light. The objective lens 38 focuses onto the screen that light transmitted by incremental areas of the deformed surface which passes through the output aperture mask 37, thereby providing a projection of the green color component of the composite color image.

Another way of considering the operation of the described light channel is that the deformations of the raster provide a phase modulation of the green filtered light projected from source 30, the input and output aperture masks serving to convert the phase modulations into amplitude modulations.

The blue and red color information is written on the raster 5 by an electron beam device 44 which is similar to electron beam device 7, including a cathode 45, grid 46, anode 47, focusing electrode 48, horizontal deflection electrodes 49 and vertical deflection electrodes 50. The red color information is written in a manner similar to that described with respect to the green color information. Accordingly, the red color signal is an amplitude modulated R-F carrier which may be derived from a circuit comparable to the circuit shown in FIGURE 3. The red color signal is applied as a first input to adding network 51 and the horizontal sweep voltage generated by oscillator 52 is applied as a second input to network 51. The output thereof is applied to the horizontal deflection electrodes 49 for providing a velocity modulated horizontal scan of the constant current electron beam.

The blue color signal is an R-F carrier amplitude modulated by the reciprocal of the intensity of the blue color component. Thus, the amplitude of the blue color signal is inversely related to the blue color intensity rather than proportional as with respect to the red and green color signals. The reason for this will become apparent presently. The blue video signal, normally supplied from a demodulator, not shown, is applied as a first input to a modulator 53 for amplitude modulating a high frequency voltage generated by oscillator 54 applied as a second input to modulator 53. The frequency of oscillator 54 is appreciably higher than the red and green R-F carrier, being sufficiently high so as to write unresolvable line charges on the raster 5, typically 45–50 mc. per second. The output of modulator 53 is applied as a first input to an adding network 55 having the low frequency vertical sweep voltage from sweep generator 56 applied as a second input thereto. The output of network 55 is applied to the vertical deflection electrodes 50 for producing a rapid wobbulation of the electron beam in the vertical direction as it is slowly scanned in that direction. It may be thus appreciated that under the influence of the voltages applied to the horizontal and vertical deflection electrodes, the constant current electron beam is scanned in the horizontal direction with a velocity modulated sweep that is a function of the red color signal and is concurrently wobbulated in the vertical direction, while also being slowly scanned in the vertical direction. The amplitude of the wobbulation is a function of the blue color signal and, more specifically, is inversely related to the intensity of the blue color component. The maximum travel of the wobbulation is approximately equal to the spacing between adjacent horizontal scans of a single field.

The velocity modulation of the horizontal scan deposits horizontal line charges, the incremental charge density of which is a function of the red color signal. As with respect to the impressing of the green color information, these line charges deform the surface of the oil so as to produce light deviating grating lines in a direction orthogonal to the horizontal scanning lines. In addition, the vertical wobbulations of the electron beam produced by the blue color signal provide a graduated smearing or partial erasure of incremental portions of the deformations along the horizontal lines of charge as a function of the wobbulation amplitude. Thus, for maximum blue intensity information the wobbulation amplitude is a minimum so that the incremental depth of the deformations along the lines of charge attributable to the blue color signal is maximum. For minimum blue intensity, the wobbulation amplitude is maximum and the incremental depth of deformation is minimum. In effect, the wobbulations provide a selective defocusing of the beam, the defocusing being inversely related to the intensity of the blue color component information. Accordingly, light deviating blue grating lines are drawn in the direction of the horizontal scan which are superimposed on and orthogonal to the grating lines produced by the red color signal. The vertical line gratings impressed by the red color information per se deviate light in a direction along the horizontal line of scan, and the horizontal line gratings impressed by the blue color information per se deviate light in a direction orthogonal to the horizontal line of scan, the extent of the light deviation being a function of the intensity of the respective color signals. It may be appreciated that superimposed blue and red grating lines deviate light in the indicated directions and also in intermediate directions as a function of the relative intensities of the impressed information.

The second light channel 6 is employed to project the information contained on the raster 5 onto the screen. Light channel 6 includes in the order recited, a dichroic mirror 57, lenticular lens 58, input aperture mask 59, Schlieren lens 60, raster 5, output aperture mask 61 and an objective lens 62. Light reflected by dichroic mirror 33 falls incident on dichroic mirror 57 which reflects the light of magenta wavelength. As shown more clearly in FIGURE 4, the input aperture mask 59 is composed of a first series of spaced opaque portions 63 which are aligned in the direction of the vertical or red light modulating line gratings of the raster 5 and a second series of spaced opaque portions 64, orthogonally disposed with respect to and superimposed on portions 63. The intersections of opaque portions 63 and 64 provide transparent apertures 65 through which the magenta wavelength light is transmitted. The output aperture mask 61 is composed of a first series of spaced filter strips 66 aligned in the direction of the red line gratings. Filter strips 66 reflect and are therefore opaque to light of red wavelength and transmit blue wavelength light. The output aperture mask 61 further includes a second series of spaced filter strips 67 orthogonal to and superimposed upon filter strips 66. The filter strips 67 reflect and are opaque to blue wavelength light and transmit red wavelength light. Accordingly, the output aperture mask 61 provides a cross grid arrangement of red and blue filter strips having intermediate transparent areas 68, the crossover areas 69 of the filter strips being opaque to the projected magenta light. The latter crossover areas may have additional opaque material overlaid so as to increase their opacity.

Referring again to FIGURE 1, the magenta wavelength light of the white light emitted by source 30 is reflected by the dichroic mirror 57 and focused by lenticular lens 58 through the transparent apertures 65 of the input mask 59 for illuminating the raster area 5. The Schlieren lens 60 images the transparent areas 65 of the input mask onto the opaque areas 69 of the output aperture mask for an undeformed condition of the oil surface. For areas of the raster 5 where the oil is deformed by the red line gratings alone, light is deviated in the direction of the red filter strips 67 with an intensity that is a function of the red information. For areas where the oil is deformed by the blue line gratings alone, light is deviated in the direction of the blue filter strips 66 with an intensity that is a function of the blue information. For areas where the oil is deformed by superimposed red and blue gratings, light is deviated so as to pass through the red filter strips 67, the blue filter strips 66 and the transparent areas 68. The spacing of the filter strip segments between the opaque crossover areas 69 is sufficient to pass on the order of several orders of the transmitted light.

The light transmitted through the red filter strips 67 and transparent areas 68 is projected onto the screen by the objective lens 62 to form the red color component of the composite color image. Light transmitted by the blue filter strips 66 and transparent areas 68 is projected onto the screen by lens 62 to form the blue color component of the composite color image. A combining lens 70 is provided through which the light transmitted by the output aperture masks 37 and 61 of the light channels 4 and 6 is directed for registering on the screen the green, blue and red color components into the composite color image.

Referring now to FIGURE 5, there is illustrated a second exemplary embodiment of the present invention in which the second light channel projecting the blue and red wavelength light is modified so that these wavelength components are separated at the input to the light channel, and input and output aperture masks are employed having solely transparent and opaque properties. The green wavelength light channel and certain of the other components are the same as in FIGURE 1, and those components which are similar have similar identifying reference characters but with an added prime notation.

Considering now the red and blue wavelength light channel 6′ the red wavelength component of the filtered magenta light emitted from light source 30′ is reflected by a dichroic mirror 71, the dichroic mirror transmitting the blue light. The blue wavelength light component becomes incident on and is reflected by a dichroic mirror 72. An input aperture mask 73 is provided having a first series of transparent and opaque portions 74 and 75, respectively, aligned in the direction of the red line gratings of the raster 5′. Input aperture mask 73 has a further series of transparent and opaque portions 76 and 77, respectively, in juxtaposition with the first series and aligned in the direction of the blue line gratings of the raster 5′. An output aperture mask 78 is provided having a first series of opaque and transparent portions 79 and 80, respectively, corresponding to the transparent and opaque portions 74 and 75 of input mask 73, also aligned in the direction of the red line gratings. Mask 78 further has a second, juxtaposed set of opaque and transparent portions 81 and 82, respectively, corresponding to the transparent and opaque portions 76 and 77 of input mask 73 and aligned in the direction of the blue line gratings.

Light of red wavelength reflected by dichroic mirror 71 is focused by a lenticular lens 83 so as to be transmitted through transparent portions 74 of mask 73. Schlieren lens 60′ images the transparent portions 74 onto the opaque portions 79 of output mask 78 in the absence of red line gratings impressed on the oil surface, light being deviated by impressed red line gratings so as to be transmitted through the transparent portions 80 as a function of the oil surface deformations produced by said red line gratings and projected onto the screen, not shown, by objective lens 62′ as the red color component of the composite color image. Light of blue wavelength reflected by dichroic mirror 72 is focused by a lenticular lens 84 so as to be transmitted by the transparent portions 76 of the input aperture mask 73, this light being imaged in similar fashion as previously described onto the opaque portions 81 of output mask 78 in the absence of blue line gratings and transmitted by transparent portions 82 as a function of the oil surface deformations produced by said blue line gratings. The light transmitted by transparent portions 82 is projected by lens 62′ as the blue color component of the composite color image.

Although the systems of FIGURES 1 and 5 are directed to the projection of three color component images, the systems can be modified in accordance with the teaching herein set forth to project four component images. Accordingly, a fourth component image can be written on the first raster area as a line grating superimposed on and orthogonal to the green grating in the manner as shown with respect to the impressing of the blue and red information on the second raster area.

For example, the system of FIGURE 1 may be modified to additionally write and project the black and white color information of the composite color image. A black and white video signal is thus employed to wobbulate the vertical scan of the beam of the device 7. For such application the dichroic mirror 33 is given the property of transmitting half of the incident white light and reflecting the other half. The input aperture mask 35 is made similar to input aperture mask 59 of the second optical channel, and output aperture mask 37 is made comparable to output mask 61, with the portions corresponding to the blue filter strips made transparent and the portions corresponding to the red filter strips fabricated as green filter strips. The green line information will be deviated as before but now passing through green filter strips. The white light information is deviated in the vertical direction passing through the transparent areas of the mask.

FIGURE 5 can be modified to write and project a fourth component image by modifying the first optical channel 4′ to correspond to the second optical channel 6′. Thus, input aperture mask 35′ is made similar to mask 73, and the output aperture mask 37′ is made similar to the mask 78. An additional dichroic mirror is inserted in the first channel for transmitting a portion of the incident white light and reflecting the remaining white light toward dichroic mirror 33′.

It may further be appreciated that the disclosed systems can be employed to write and project three or four separate and distinct black and white images superimposed on the screen. In this case white light is directed through each of the two optical channels. The input aperture masks for each channel may be the same as mask 59 of FIGURE 1 or mask 73 of FIGURE 5, and the output aperture masks for each channel provided with inversely complementary transparent and opaque portions.

Although specific exemplary embodiments of the invention have been described for purposes of comprehensive disclosure, the invention is not to be thus limited and it is obvious that numerous modifications and changes may occur to those skilled in the art which do not depart from the basic teachings herein set forth. The appended claims are intended to embody all modifications falling within the true scope of the invention.

What I claim as new and desire to secure by Letters Patent of the United States is:

1. A projection system for displaying color information from a deformable light modulating means comprising:
(a) a source of light,
(b) a first optical channel for projecting light of at least a first color component of said color information including a first raster area on said deformable means which has impressed thereon light deviating deformations corresponding to the first color component information, and light masking means,
(c) means including said masking means directing light emitted by said source of the first color component through said first channel for providing, selectively, blocking and transmission by said masking means of entire orders of light deviated by said raster as a function of said deformations,
(d) a second optical channel for projecting light of second and third primary color components of said color information including a second raster area on said deformable means which has impressed thereon light deviating deformations corresponding to the second and third color component information, and a second light masking means;
(e) means including said second masking means for directing light emitted by said source of the second and third color components through said second channel for providing, selectively, blocking and transmission by said second masking means of entire orders of deviated second and third color component light as a function of the deformations impressed upon said second raster.

2. A projection system for displaying color information from a deformable light modulating means comprising:
(a) a source of light,
(b) a first optical channel for projecting light of at least a first color component of said color information including a first raster area on said deformable means which has impressed thereon deformations corresponding to the first color component information, and light masking means having a plurality of transparent and opaque areas,
(c) means for directing green light emitted by said source of the first color component through said first channel and focusing it into said opaque areas in the absence of deformations impressed on said raster area, said first color component light being deviated through said transparent areas in the presence of and with an intensity that is a function of said deformations,
(d) a second optical channel for projecting light of second and third color components of said color information including a second raster area on said deformable means which has impressed thereon deformations corresponding to the second and third color component information, and a second light masking means including transparent and opaque areas,
(e) means for directing light emitted by said source of the second and third color components through said second channel and focusing it onto areas of said second masking means opaque to both color components in the absence of deformations impressed on said second raster area, said second and third color component light being deviated through areas of said second masking means transparent thereto in the presence of and with an intensity that is a function of corresponding deformations on said second raster area.

3. A projection system for displaying color information from a deformable light modulating means comprising:
(a) a source of light,
(b) a first optical channel for projecting light of a first color component of said color information including a first raster area on said deformable means which has impressed thereon a light deviating line pattern corresponding to the first color component information, and light masking means having a plurality of transparent and opaque areas, (c) means for directing light emitted by said source of the first color component through said first channel and focusing it into said opaque areas in the absence of deformations impressed on said raster area, said first color component light being deviated through said transparent areas in the presence of and with an intensity that is a function of said deformations, (d) a second optical channel for projecting light of second and third color components of said color information including a second raster area on said deformable means which has impressed thereon orthogonally arranged and superimposed second and third light deviating line patterns corresponding, respectively, to the second and third color component information, and a second light masking means including a first series of areas transparent and opaque to the second color component light aligned in the direction of said second line pattern and a second series of areas transparent and opaque to the third color component light aligned in the direction of said third line pattern, (e) means for directing light emitted by said source of the second and third color components through said second channel and focusing it onto opaque areas of said second masking means in the absence of deformations impressed on said second raster, said second color component light being deviated through the transparent areas of said first series in the presence of and with an intensity that is a function of the deformations of said second light pattern, and said third color component light being deviated through the transparent areas of said second series in the presence of and with an intensity that is a function of the deformations of said third line pattern.

4. A projection system as in claim 3 in which said first and second series of transparent and opaque areas are arranged in superposition.

5. A projection system as in claim 3 in which said first and second series of transparent and opaque areas are arranged in juxtaposition.

6. A projection system for displaying color information from a deformable light modulating means comprising:

(a) a source of light, (b) a first optical channel for projecting light of at least a first color component of said color information including a first raster area on said deformable means which has impressed thereon a light deviating line pattern corresponding to the first color component information, and light masking means having a plurality of transparent and opaque areas, (c) means for directing light emitted by said source of the first color component through said first channel and focusing it onto said opaque areas in the absence of deformations impressed on said raster area, said first color component light being deviated through said transparent areas in the presence of and with an intensity that is a function of said deformations, (d) a second optical channel for projecting light of second and third color components of said color information including a second raster area on said deformable means which has impressed thereon orthogonally arranged and superimposed second and third light deviating line patterns corresponding, respectively, to the second and third color component information, and a second light masking means including a first series of spaced filter strips aligned in the direction of said second line pattern, said filter strips rejecting the second color component light, and passing the third color component light, and a second series of spaced filter strips superimposed on said first series and aligned in the direction of said third line pattern, said second series filter strips rejecting the third color component light and passing the second color component light, (e) means for directing light emitted by said source of the second and third color components through said second channel and focusing it onto crossing areas of said filter strips in the absence of deformations impressed on said second raster, said second color component light being deviated through said second series filter strips and the presence of and with an intensity that is a function of deformations of said second line pattern, and said third color component light being deviated through said first series filter strips in the presence of and with an intensity that is a function of deformations of said third line pattern.

7. A projection system for displaying color information from a deformable light modulating means comprising:

(a) a source of light, (b) a first optical channel for projecting light of a first color component of said color information including in the order recited a first input aperture mask, a first raster area on said deformable means which has impressed thereon a light deviating line pattern corresponding to the first color component information, and a first output aperture mask, said input and output aperture masks each having a plurality of transparent and opaque areas.

(c) means for directing light emitted by said source of the first color component through said first channel so as to image the transparent areas of said input mask onto the opaque areas of said output mask in the absence of deformations impressed on said raster area, said first color component light being deviated through the transparent areas of said output mask in the presence of and with an intensity that is a function of the deformations of said line pattern, (d) a second optical channel for projecting light of second and third color components of said color information including in the order recited a second input aperture mask having orthogonally arranged and superimposed first and second series of transparent and opaque areas, a second raster area on said deformable means which has impressed thereon orthogonally arranged and superimposed second and third light deviating line patterns corresponding, respectively, to the second and third color component information, and a second output aperture mask having a first series of spaced filter strips which reject the second color component light and pass the third color component light and a second series of spaced filter strips orthogonally arranged and superimposed on said first series which reject said third color component light and pass said second color component light, (e) means for directing light emitted by said source of the second and third color components through said second channel so as to image the crossing transparent areas of said second input mask onto crossing areas of the filter strips of said second output mask in the absence of deformations impressed on said second raster, said second color component light being deviated through said second series filter strips in the presence of and with an intensity that is a function of the deformations of said second line pattern, and said third color component light being deviated through said first series filter strips in the presence of and with an intensity that is a function of the deformations of said third line pattern.

8. A projection system as in claim 7 wherein said deformable light modulating medium includes a transparent oil layer and said first color component is of substantially green wavelength light, said second color component is of substantially red wavelength light and said third color component is of substantially blue wavelength light.

9. A projection system for displaying color information from a deformable light modulating means comprising:

(a) a source of light, (b) a first optical channel for projecting light of a first color component of said color information including a first raster area on said deformable means which has impressed thereon a light deviating line pattern corresponding to the first color component information, and a light masking means having a plurality of transparent and opaque areas, (c) means for directing light emitted by said source of the first color component through said first channel and focusing it onto said opaque areas in the absence of deformations impressed on said raster area, said first color component light being deviated through said transparent areas in the presence of and with an intensity that is a function of said deformations, (d) a second optical channel for projecting light of second and third color components of said color information including a second raster area on said deformable means which has impressed thereon orthogonally arranged and superimposed second and third light deviating line patterns corresponding, respectively, to the second and third color component information, and a second light masking means including a first series of transparent and opaque areas aligned in the direction of said second line pattern and a second series of transparent and opaque areas aligned in the direction of said third line pattern and in juxtaposition with said first series, (e) means for directing light emitted by said source of the second color component through said second channel and focusing it onto the said first series opaque areas in the absence of deformations of said second line pattern, said second color component light being deviated through said second series transparent areas in the presence of and with an intensity that is a function of the deformations of said second line pattern, (f) and means for directing light emitted by said source of the third color component through said second channel and focusing it onto the second series opaque areas in the absence of deformations of said third line pattern, said third color component light being deviated through the second series transparent areas in the presence of and with an intensity that is a function of the deformations of said third line pattern.

10. A projection system for displaying multiple optical images from corresponding information impressed on a deformable light modulating means comprising:

(a) a source of light, (b) a first optical channel for projecting at least a first image including a first raster area on said deformable means which has impressed thereon at least a single light deviating line pattern corresponding to the first image information, and light masking means having a plurality of transparent and opaque areas, (c) means for directing green light emitted by said source through said first channel and focusing it onto said opaque areas in the absence of deformations impressed on said raster area, said directed light being deviated through said transparent areas in the presence of and with an intensity that is a function of said deformations, (d) a second optical channel for projecting second and third images including a second raster area on said deformable means which has impressed thereon orthogonally arranged and superimposed second and third light deviating line patterns corresponding, respectively, to the second and third image information, and a second light masking means including a first series of transparent and opaque areas aligned in the direction of said second line pattern and a second series of transparent and opaque areas aligned in the direction of said third line pattern, (e) means for directing light emitted by said source through said second channel and focusing it onto opaque areas of said second masking means in the absence of deformations impressed on said second raster area, said light being deviated through the transparent areas of said first series in the presence of and with an intensity that is a function of the deformations of said second line pattern and said light being deviated through the transparent area of said second series in the presence of and with an intensity that is a function of said third line pattern.

11. A projection system for displaying multiple optical images from corresponding information impressed on a deformable light modulating means comprising:

(a) a first raster area on said deformable means, (b) means for impressing on said raster area at least a single light deviating line pattern corresponding to the first image information, (c) a second raster area on said deformable means, (d) means for impressing on said second raster area orthogonally arranged and superimposed second and third light deviating line patterns corresponding, respectively, to the second and third image information, (e) a source of light, (f) a first optical channel for projecting at least a first image including said first raster area and light masking means having a plurality of spaced apart areas transparent to light from said source that is directed through said first channel and intermediate areas opaque to said directed light, said transparent areas having dimensions sufficient to pass at least one entire order of said directed light, (g) means for focusing said directed light onto said opaque areas in the absence of deformations impressed on said first raster area, said directed light being deviated through said transparent areas in the presence of and with an intensity that is a function of said deformations, (h) a second optical channel for projecting said second and third images including said second raster area and second light masking means having a plurality of spaced apart areas transparent to light from said source that is directed through said second channel and intermediate areas opaque to light directed through said second channel, said transparent areas of said second masking means having dimensions sufficient to pass at least one entire order of light directed through said second channel, and (i) means for focusing the light directed through said second channel onto the opaque areas of said second masking means in the absence of deformations on the second raster area, said light being deviated through the transparent areas of said second masking means in the presence of and with an intensity that is a function of the deformations of said second and third line patterns.

12. A projection system for displaying multiple optical images from corresponding information impressed on a deformable light modulating means comprising:

(a) a raster area on said deformable means, (b) means for impressing on said raster area orthogonally arranged and superimposed first and second light deviating line patterns corresponding, respectively, to first and second image information, (c) a source of light, (d) an optical channel for projecting first and second images including said raster area and light masking means having a plurality of spaced apart areas transparent to light from said source that is directed through said channel and intermediate areas opaque to said directed light, said transparent areas having dimensions sufficient to pass at least one entire order of said directed light, (e) means for focusing said directed light onto said opaque areas in the absence of deformations impressed on said raster area, said directed light being deviated through said transparent areas in the presence of and with an intensity that is a function of the deformations of said first and second line patterns.

13. A projection system for displaying multiple optical images from corresponding information impressed on a deformable light modulating medium comprising:

(a) an electron beam device, (b) means for scanning the electron beam so as to deposit on said deformable medium during each field of scan a series of line charges extending in a first direction which deform the surface of said medium so as to form a first light deviating line pattern corresponding to a first image information and a second light deviating line pattern corresponding to a second image information superimposed upon said first line pattern, said first line pattern being composed of a first series of ridge and trough portions extending in a second direction orthogonal to said first direction and said second line pattern being composed of a second series of ridge and trough portions extending in said first direction, said line charges being deposited on alternate lines in an interlaced manner so as to interchange the ridge and trough portions of said second line pattern during successive fields, (c) means for periodically introducing a phase shift to said scanning means for spatially interchanging the ridge and trough portions of said first line pattern during successive fields, (d) a source of light, (e) an optical channel for projecting first and second images including said deformable medium and light masking means, and (f) means including said light masking means directing light from said source through said optical channel for providing, selectively, blocking and transmission of said light as a function of the information impressed upon said medium.

References Cited by the Examiner

UNITED STATES PATENTS

| | | | |
|---|---|---|---|
| 2,740,829 | 4/1956 | Gretener | 178—5.4 |
| 2,927,959 | 3/1960 | Mast | 178—7.5 |
| 3,118,969 | 1/1964 | Glenn | 88—61 |

DAVID G. REDINBAUGH, *Primary Examiner.*

J. H. SCOTT, *Assistant Examiner.*